(12) United States Patent
Markiw et al.

(10) Patent No.: US 10,571,027 B2
(45) Date of Patent: Feb. 25, 2020

(54) METAL RING SEAL AND IMPROVED PROFILE SELECTIVE SYSTEM FOR DOWNHOLE TOOLS

(71) Applicant: Gryphon Oilfield Solutions, LLC, Houston, TX (US)

(72) Inventors: John Andrew Markiw, Okotoks (CA); Lennard Roy Sihlis, Calgary (CA); Chayne Roy Bradley, Calgary (CA)

(*) Notice: Subject to any disclaimer, the term of this patent is extended or adjusted under 35 U.S.C. 154(b) by 89 days.

(21) Appl. No.: 16/003,303

(22) Filed: Jun. 8, 2018

(65) Prior Publication Data

US 2018/0355976 A1 Dec. 13, 2018

Related U.S. Application Data

(60) Provisional application No. 62/517,284, filed on Jun. 9, 2017.

(51) Int. Cl.
| | |
|---|---|
| E21B 34/14 | (2006.01) |
| E21B 34/10 | (2006.01) |
| F16J 15/3284 | (2016.01) |
| E21B 33/12 | (2006.01) |
| E21B 43/26 | (2006.01) |
| E21B 34/06 | (2006.01) |
| E21B 34/00 | (2006.01) |

(52) U.S. Cl.
CPC ........... *F16J 15/3284* (2013.01); *E21B 33/12* (2013.01); *E21B 34/14* (2013.01); *E21B 34/063* (2013.01); *E21B 34/10* (2013.01); *E21B 43/26* (2013.01); *E21B 2034/007* (2013.01)

(58) Field of Classification Search
CPC ............. E21B 2034/007; E21B 34/063; E21B 33/1212; E21B 34/14; E21B 34/10; F16J 15/3284

USPC .................................................. 277/647, 530
See application file for complete search history.

(56) References Cited

U.S. PATENT DOCUMENTS

| | | | |
|---|---|---|---|
| 4,384,730 A * | 5/1983 | Diehl ..................... | E21B 33/04 277/322 |
| 4,669,541 A | 6/1987 | Bissonnette et al. | |
| 7,086,669 B2 | 8/2006 | Evans et al. | |
| 7,201,232 B2 | 4/2007 | Turner et al. | |
| 7,581,596 B2 | 9/2009 | Reimert et al. | |

(Continued)

FOREIGN PATENT DOCUMENTS

WO 2014038956 3/2014

OTHER PUBLICATIONS

AF Global, Riser Gas Handling, Apr. 17, 2017, www.afglobalcorp.com/documents/Products/.../RGH2-brochure_LowRes_FINAL.pdf.

(Continued)

*Primary Examiner* — Cathleen R Hutchins

(57) ABSTRACT

A metal ring seal capable of providing a fluid seal between two downhole assemblies. The ring seal has a "C" shape, is initially located inside one of the downhole assemblies adjacent to an internal wedged section of that assembly and has an inner diameter that is at least as large as the outer diameter of the second downhole assembly. When the ring seal is moved along the internal wedged section into a sealing position, the two ends of the "C" shape sealingly contact each other and the inner diameter of the ring is smaller than the outer diameter of the second assembly so as to create a seal between the first and second assemblies.

23 Claims, 3 Drawing Sheets

(56) References Cited

U.S. PATENT DOCUMENTS

| | | | |
|---|---|---|---|
| 8,757,671 B2 | 6/2014 | Pallini et al. | |
| 9,279,300 B2 | 3/2016 | Kolle et al. | |
| 9,316,084 B2 | 4/2016 | Carter et al. | |
| 9,428,992 B2 | 8/2016 | Merron | |
| 9,488,035 B2 | 11/2016 | Crowley et al. | |
| 2004/0036225 A1 | 2/2004 | Ritter et al. | |
| 2010/0258311 A1 | 10/2010 | Craig et al. | |
| 2012/0160521 A1 | 6/2012 | McGlothen et al. | |
| 2012/0169013 A1 | 7/2012 | Smith et al. | |
| 2013/0153220 A1* | 6/2013 | Carter | E21B 33/128 166/285 |
| 2013/0180733 A1 | 7/2013 | Bradshaw et al. | |
| 2013/0299193 A1 | 11/2013 | Duong | |
| 2013/0299199 A1* | 11/2013 | Naedler | E21B 43/14 166/386 |
| 2014/0318816 A1 | 10/2014 | Hofman et al. | |
| 2015/0034332 A1 | 2/2015 | Merron | |
| 2015/0114639 A1 | 4/2015 | Williamson et al. | |
| 2015/0176361 A1* | 6/2015 | Prosser | E21B 34/14 166/192 |
| 2015/0285026 A1 | 10/2015 | Frazier | |
| 2016/0061001 A1 | 3/2016 | Fitzhugh et al. | |

OTHER PUBLICATIONS

Godse, AG, Understand Dry Gas Seals, ProQuest document link, Hydrocarbon Processing 79.2 (Feb. 2000): 85.
Society of Petroleum Engineers, Drilling Systems Automation Technical Section, Drillbotics Guidelines, Apr. 17, 2017.

* cited by examiner

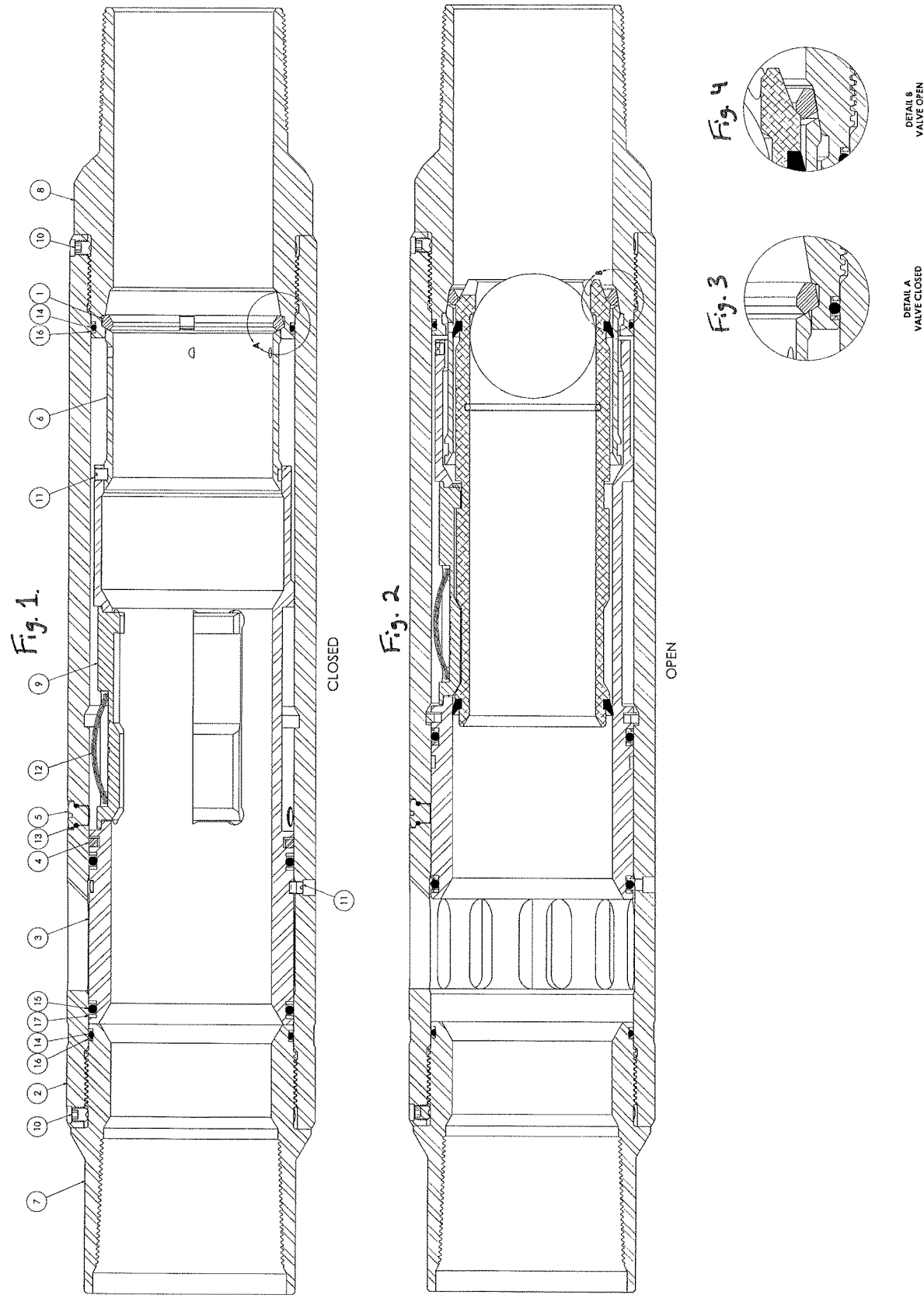

DETAIL B

SECTION A-A

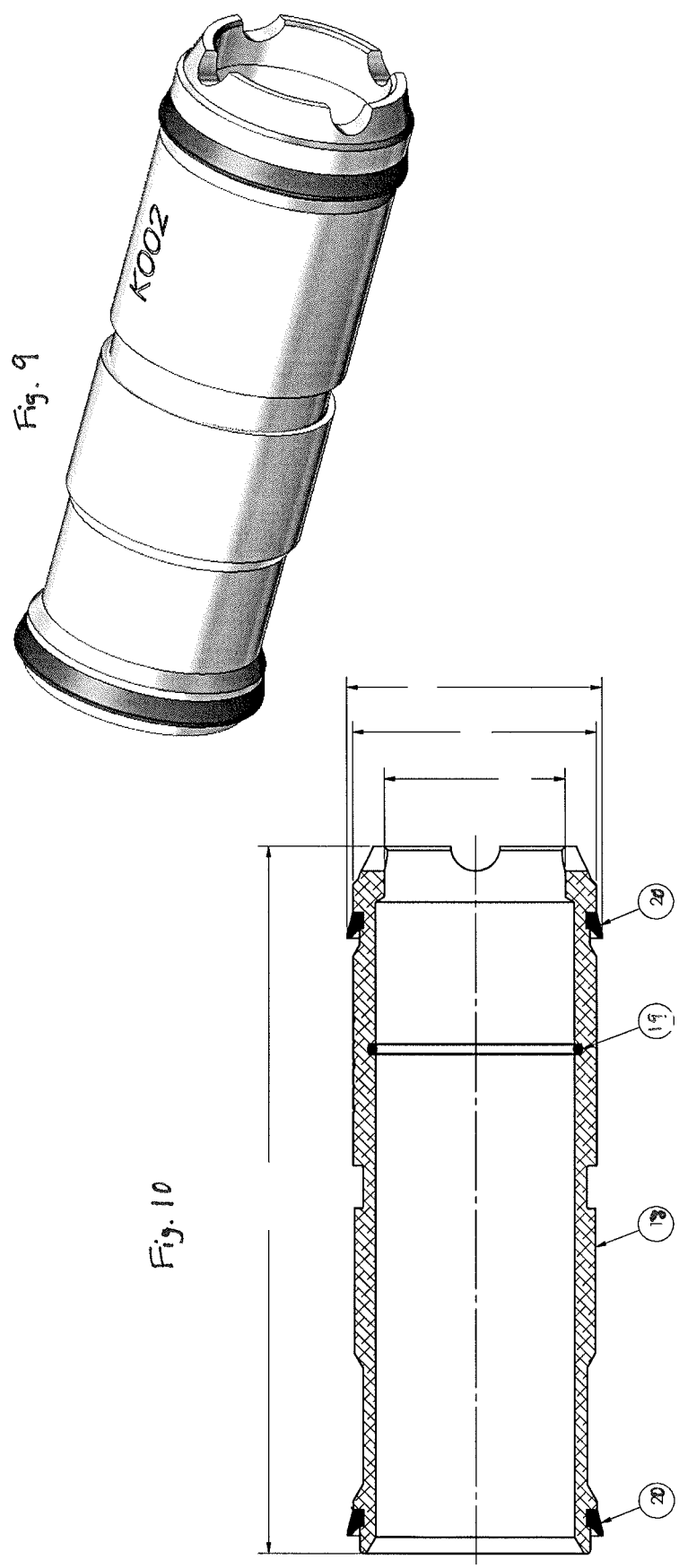

METAL RING SEAL AND IMPROVED PROFILE SELECTIVE SYSTEM FOR DOWNHOLE TOOLS

CROSS REFERENCE TO RELATED APPLICATION

This application claims the benefit of U.S. Provisional Application No. 62/517,284 filed on Jun. 9, 2017 and titled "Metal Ring Seal and Improved Profile Selective System for Downhole Tools."

BACKGROUND

Field of the Invention

This invention generally relates to subassemblies used in wells for hydrocarbon bearing formations and more particularly to an improved seal between components in an improved system for fracturing production zones in a well.

Description of Related Art

Various types of completion and production techniques for subterranean oil and gas wells requires the use of various subassemblies or "subs" that are located within the well bore. These include various types of sleeves, valves, plugs, and packers. These subs may form a part of the casing that is cemented into the wellbore in some cases, part of another tubular such as a production string, or may be inserted into the casing, another string or another subassembly. As a result, it is often desirable or necessary to create a seal between a sub and a casing or other string, another sub, or between various parts of a sub.

For example, many subterranean oil and gas wells are stimulated in order to increase production. This stimulation or fracturing creates conduits in the formation that improve the flow of hydrocarbons from the formation to the well. A single well often will have numerous zones that are independently fractured, sometimes referred to as zone fracturing. In zone fracturing, isolation of each zone is typically achieved through the use of a number of valve subs that are sequentially opened to allow pressurized fluid from the central bore to independently fracture each zone of the well.

One prior method of selectively activating a number of valves that are located along the length of a well is the use of ball valve seat mechanisms that can receive a ball placed into the casing. Once the ball is seated in the valve seat, flow through the valve is cut off. The pressure of fracturing fluid injected into the casing will then cause the closed valve seat mechanism to slide a piston forward in the valve sub thereby opening ports in the wall of the valve sub to allow the pressure of the fracturing fluid to penetrate into a production zone of a hydrocarbon bearing formation. Typically a number of ball valve subs are placed in series in the casing at predetermined intervals in the formation. The largest diameter valves seat is placed nearest the top of the well with each lower valve having a progressively smaller diameter valve seat so the bottom valve has the smallest valve seat. In this manner, the furthest valve seat with the smallest valve seat opening can be closed by placing the matching size ball into the casing.

The ball can pass through all the preceding valve subs, which each have larger diameters until it reaches the lowest valve sub that has a matching size. The ball seats in the lowest valve sub and opens that valve. The ball seat for a particular ball valves must have a diameter that is sufficiently narrower than the ball seat immediately above it so that the matching ball can easily pass through the ball seat in all of the above ball valves and yet have sufficient contact surface with the ball to adequately support the ball in position and form a fluid-tight seal in the presence of the high pressure fluid upstream of the ball that is used to open the valve and fracture that portion of the formation.

Once fracturing of the lowest valve is complete, the next smallest ball is placed into the casing. It seats on the next lowest valve seat to close off the lower portion of the bore and open the valve to allow fracturing of the second zone. By sequentially dropping the matching balls into the casing, the zones can be individually isolated and fractured. Once all the zones have been individually fractured, a drill string can be used to mill out the balls so as to allow production from all zones of the formation. However, this takes additional time and expense and generates fines in the well that could plug pores and reduce the production of the oil and gas.

Another shortcoming of the prior ball seat mechanism is that the volume of fluid, and the rate of fluid flow, is constricted by the progressively decreasing diameter of the ball valve seat mechanism disposed in each of the valve subs. When a large number of stages or zones are required, the ultimate flow rate that can be obtained is not high. For example, when there are as many as 23 stages, the achievable flow rate is less than 15 cubic meters per minute through the valve subs. The decreased diameter of the ball valve seats can also result in erosion of the ball seat itself as well as downstream components when water mixed with sand, proppants or other materials is pumped down at high speeds. Also, it is difficult to cement these valves in place with a casing string as there is no way to clean or wipe the cement out of the valve seat mechanisms. This may require the use of a separate liner with open hole packers, which is more expensive to carry out and also further restricts the wellbore.

Therefore, there continues to be a need for a method to provide seals in subs used in oil and gas wells, in particular in valves used for zone fracturing of formations, that provides an adequate seal against the extremely high pressures that may be generated and that also does not significant restrict the internal bore of the well after the fracturing process has been completed.

BRIEF SUMMARY OF THE INVENTION

A metal ring seal capable of providing a fluid seal between two downhole assemblies. The ring seal has a "C" shape, is initially located inside one of the downhole assemblies adjacent to an internal wedged section of that assembly and has an inner diameter that is at least as large as the outer diameter of the second downhole assembly. When the ring seal is moved along the internal wedged section into a sealing position, the two ends of the "C" shape sealingly contact each other and the inner diameter of the ring is smaller than the outer diameter of the second assembly so as to create a seal between the first and second assemblies.

In a preferred embodiment, the metal seal ring is used in a profile selective system where the first assembly can be a valve subassembly having a key profile and the second subassembly is a dart, such as one composed of a ball sleeve and ball, that has a mating profile. The dart selectively engages a valve that has a key profile that mates with the mating profile on the dart and opens valve. The dart further shifts the metal ring seal into the sealing position where it provides a seal between the valve assembly and the dart.

BRIEF DESCRIPTION OF FIGURES

For a more complete understanding of the present invention and for further advantages thereof, reference is now made to the following description taken in conjunction with the accompanying drawings in which:

FIG. 1 is cross sectional view of a valve from a preferred profile selective system for fracturing a well that is shown in the closed position;

FIG. 2 is a cross section view of the valve of FIG. 1 shown in the open position;

FIG. 3 is an expanded cross sectional view of the detail A of FIG. 1 showing a preferred metal ring seal of the invention;

FIG. 4 is an expanded cross-sectional view of the detail B of FIG. 2 showing a preferred metal ring seal of the invention;

FIG. 9 is a perspective view of a ball sleeve used in the valve shown in FIG. 1; and FIG. 10 is a cross sectional view of the ball sleeve of FIG. 9.

DESCRIPTION OF THE PREFERRED EMBODIMENTS

Figure 8:
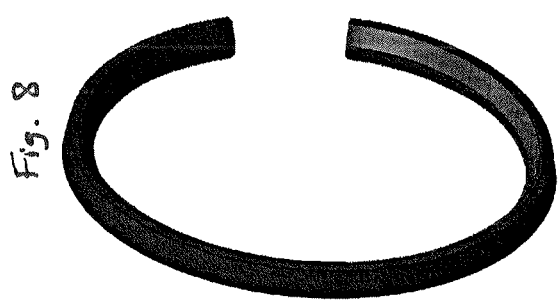
FIG. 8 is a perspective view of the preferred metal ring seal of FIG. 5.

These and further aspects, features and advantages of the invention become apparent to the skilled person from a study of the following detailed description of the preferred embodiments and claims. The examples contained herein are intended to merely describe and illustrate the invention, but not to limit it, and in particular, the invention is not limited to such examples. Each feature from one aspect or embodiment of the invention may also be used in any other aspect or embodiment of the invention. The use of the term "about" and the reference to any numerical values is intended to encompass all values that lie within the range of the respective measurement accuracy known to the skilled person.

For convenience, the term top or upper is used to refer to a component (or portion thereof) that when the particular embodiment is in the well is generally intended to be orientated or located toward or closer to the portion of the well that is upstream or toward the top end of the well. Likewise, the term bottom or lower is used to refer to a component (or portion thereof) that when the particular embodiment is in the well is generally intended to be located or oriented toward the downstream or bottom end of the well. However, unless otherwise stated, components located at either the top or bottom can generally be located at other locations or in other orientations to achieve the same effect.

In one preferred embodiment, the metal ring seal of the current invention is used in a version of the profile selective system for fracturing a well that is disclosed in U.S. Pat. No. 9,611,727 and co-pending application Ser. No. 14/454,508, both of which are hereby incorporated by reference in their entirety. While the seal ring of the current invention is discussed below in connection with a particular type of profile selective system for fracturing a well, one of skill in the art can recognize that it can also be used in numerous other types of applications, such as ball drop systems to increase the ball contact area, cement wiper plugs, and liner hanger packers.

The preferred profile selective system includes two or more tubular valve subassemblies that can be used in-line at predetermined locations along the length of the well casing or production string. Each valve used in a particular well has a unique key profile. The preferred system also includes two or more darts that each have a mating profile that matches and engages with only a single profile and thus can be used to activate one or more specific valve assemblies in the well that have the unique key profile. In a particular embodiment, the dart is a combination of a ball sleeve with a ball seat at the front end and a ball that seats on the ball seat. The outside of the ball sleeve has the unique mating profile (or dart profile) that allows the ball sleeve to engage with only a valve assembly that contains the corresponding key profile. The number of valve subs and the spacing between the valve subs in a well can be determined based upon the size of the formation and the number of production zones contained in the formation.

It is particularly preferred that the ball sleeve 18 (depicted in FIGS. 9 and 10) and the corresponding ball is manufactured out of a dissolvable material. There are numerous dissolvable materials known and available in the oil and gas industry. These generally are composed of a magnesium or aluminum alloy. The dissolvable materials allow the ball sleeve 18 and ball to begin to dissolve and break apart when exposed to water, salt water or acid naturally found in the well or commonly used during fracturing operations and at the elevated temperatures naturally found in the well. This process generally occurs over the course of a week so there is sufficient time for the ball sleeve 18 and ball to active the desired valve assembly and for the respective fracturing operation to be completed before the ball sleeve 18 and ball start to break apart. However, the dissolving process could range from days to months depending upon the particular conditions that are present.

The use of dissolving materials for the ball sleeve 18 and corresponding ball can avoid the need to have to use a drill to mill out the ball and ball sleeve 18 after the fracturing operations are complete. This both saves time and money during the completion operations. Alternatively, if a conventional ball sleeve 18 is left in the valve assembly it will further restrict the internal bore of the casing. In this case, the use of dissolvable materials for the ball sleeve 18 and ball provide for an increased internal diameter after the fracturing operations are complete. This provides for an increased fluid flow and allows the use of larger diameter tools and other subassemblies to be lowered to points in the well that are below the valve assembly.

An example valve from a particular embodiment of the profile selective system is shown in FIGS. 1 and 2, with FIG. 1 being shown in the closed position and FIG. 2 being shown in the open position. The overall valve assembly comprises a tubular housing 2 that has a central bore and a plurality of radial openings or slots to allow fluid to pass from the central bore to contact the formation outside the housing 2. A sliding valve sleeve 3 is located within the housing 2 to selectively block the radial openings in the housing 2. An upper shear screw 11 can be provided to prevent the valve sleeve 3 from moving to unblock the openings in the housing 2 until a threshold pressure is applied. Similarly, lock ring 4 is preferably used to secure valve sleeve 3 in the open position in housing 2 after the valve has been activated to ensure that the openings in housing 2 remain open.

The valve assembly also preferably has an upper sub 8 and a lower sub 7 that have standard threaded connections to allow the valve assembly to be threaded to other sections of the well casing or production string. For manufacturing convenience and to allow sleeve 3 to be installed into housing 2, the upper sub 8 and lower sub 7 are shown as being connected to housing 3 via a threaded connection along with an O-ring 14 to ensure a fluid tight seal. However, if desired and depending upon the configuration of the other components and the materials used, one or both of the upper sub 8 and lower sub 7 could instead be integrally formed with housing 2 or connected using other known methods.

The valve sleeve 3 further contains a key profile 9. The key profile 9 is preferably composed of two raised rings on the sleeve profile. A drag block spring 12 is provided to bias the key profile 9 toward the center of the conduit so as to allow it to engage with the mating profile on the outside of the ball seat sleeve 18 when present. One ring has squared edges to provide a shoulder that assists in transferring force from the mating profile on a ball sleeve 18 to the key profile 9 and thus the valve sleeve 3 so as to open the valve. The size, shape and relative location of the two rings provide a unique key profile so that only a ball sleeve 18 that contains the mating profile can engage and shift the valve sleeve 3 so as to uncover the openings in housing 2 in this particular valve assembly.

At the lower end of the valve sleeve 3 is activation sleeve 6, which contacts the interior of the valve sleeve 3 and is connected to the valve sleeve 3 by a lower sheer screw 11. Preferably valve sleeve 3 is thinner at the lower end such that the interior surface of activation sleeve 3 does not protrude into the interior bore of the housing 3 more than the valve sleeve 3 at its thickest point. The thickest point of valve sleeve 3 is generally determined by the thickness required at the portion of the valve sleeve 3 that covers the openings in the housing 2.

Immediately below the activation sleeve 6, is seal ring 1. When the valve assembly is in the closed position, as shown in FIG. 1, the seal ring 1 is located in a radial recess in bottom sub 8 that is attached to housing 2. Immediately below the radial recess the inner surface of bottom sub 8 is tapered inward at approximately a 10° angle. Seal ring 1 is preferably composed of ASTM A48 Class 40 cast iron. This material is generally reported as having a hardness rating of from about 200-250 HB and an ultimate tensile strength of between 30,000 and 40,000 psi. The high compressive strength of cast iron is an important requirement for the seal ring 1. The seal ring 1 should preferably be sufficiently brittle enough to allow it to be milled out using a drill if circumstances require maximum internal clearance. As a result, a higher class of cast iron is generally not preferred as it would render the seal ring 1 more difficult to mill out if necessary. If a lower class of cast iron is used, the material may not have a sufficient compressive strength. However, as the seal ring 1 preferably only extends into the central bore about 1/16 of an inch beyond the valve sleeve, the seal ring 1 preferably does not need to be milled out at the end of the fracturing operation. It is also not necessary to ensure that the yield strength of the seal ring 1 is higher than the anticipated pressure that will be applied to the seal ring during use. It has been found that high pressures that exceed the yield strength of the seal ring 1 result in the ring deforming and providing a tighter seal between the ball sleeve 18 and bottom sub 8.

Figure 7:
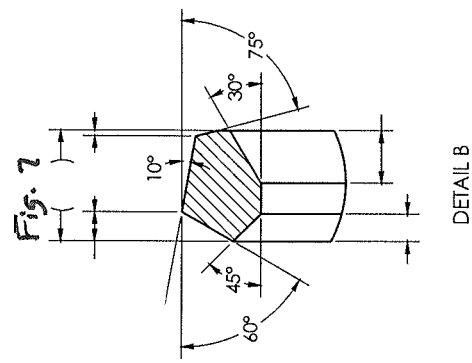
FIG. 7 is an expended cross sectional view of the detail B of FIG. 6.
Figure 6:
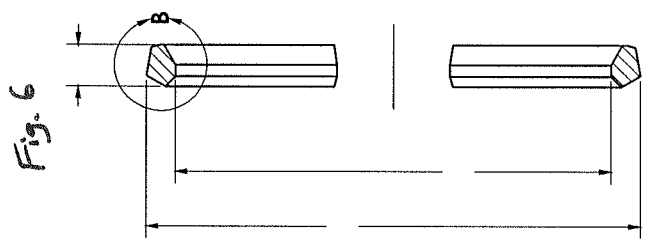
FIG. 6 is a cross sectional view of the preferred metal ring seal taken along the line A-A in FIG. 5.
Figure 5:
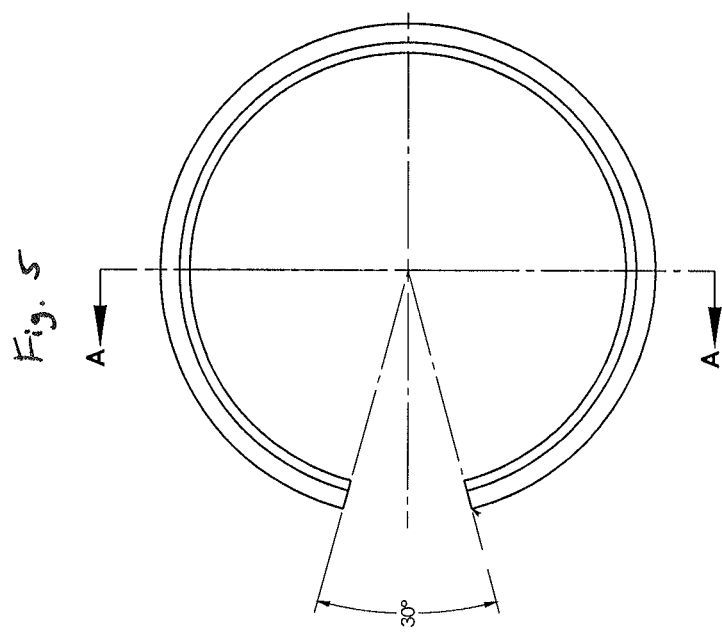
FIG. 5 is an elevation view of a preferred metal ring seal according to the invention.

As seen in FIGS. 5-8, seal ring 1 is formed in the shape of a "C" with an opening of approximately 30°. The two ends of the seal ring have sharp edges as opposed to being chamfered. At least the two ends of the seal ring as well as the outer surface have a surface that is designed to seal. The outer diameter of seal ring 1 is slightly larger than the internal bore of the wedge portion of lower sub 8 so that there is an interference fit between the two parts. As can be better seen in FIGS. 6 and 7, the seal ring 1 has an angled cross section. Preferably the outer surface of seal ring 1 (the top surface in FIG. 7) is angled to match the angle of the wedge portion of lower sub 8, which in this case is 10°. The purpose of the angle of this surface is to collapse the seal ring 1 as it is pushed into the wedge portion of the lower sub 8. The remaining angles of the cross section of the seal ring 1 are there to aid in trapping the ring between the various other components and hold it in place so that it can adequately provide the required seal. Specifically, the 60° angled surface is designed to mate with the angled front end of the activation sleeve 6 and allows the activation sleeve to push the seal ring 1 out of the radial slot in lower sub 8 and into the wedge portion. The 45° angled surface is designed to mate with the surface toward the lower end of the ball sleeve 18, thereby providing additional support and sealing between the ball sleeve 18 and the valve assembly. The 75° surface is designed to aid the ring in exiting the radial slot in the lower sub 8. The 30° surface is designed to help minimize the possibility that a tool being pulled out of the well might catch on the seal ring 1.

When the valve assembly is in the closed position as is shown in FIGS. 1 and 3, the seal ring 1 has a larger inner diameter than the activation sleeve 6 and valve sleeve 3. As a result, the seal ring 1 does not protrude at all into the inner bore of the valve assembly and does not restrict the flow of fluid through the valve assembly or the diameter of tools and other assemblies that can be passed through the valve assembly to lower portions of the well.

To activate a particular valve assembly, a ball sleeve 18 as shown in FIGS. 9 and 10 along with the corresponding ball is placed into the well. The ball sleeve 18 is generally tubular with a hollow central bore. A wiper ring 20 is bonded to the upper and lower end of the ball sleeve 18 using adhesive. The wiper ring 20 contacts the interior of the casing to help provide a seal between the ball sleeve 18 and casing. The ball seats in the ball seat at the front of the ball sleeve 18 also provides a fluid seal when there is increased fluid pressure in the upper portion of the well, such as the increased fluid pressure used to pump the ball sleeve 18 down the well. The ball is preferably located within the ball sleeve 18 before the ball sleeve 18 is pumped down into the well. In such a case, O-ring 19 can be provided in the inner bore of ball sleeve 18 so as to help prevent the ball from falling out of the ball sleeve 18 while it is being handled prior to and during the process of inserting the ball sleeve 18 into the well.

Once inserted into the well, the ball sleeve 18 is pumped down to the various valve assemblies. The ball sleeve has a mating profile that matches the key profile 9 on only one of the valve assemblies used in the particular well. As a result, the ball sleeve will bypass every valve assembly where the mating profile does not match the key profile 9 on that particular valve assembly.

When the ball sleeve 18 reaches the particular valve assembly that contains the matching key profile 9, the key profile 9 will engage with the mating profile on the ball sleeve 18. Continued application of fluid pressure behind the ball sleeve 18 serves to shear the upper shear pin 11 connecting the housing 2 to the valve sleeve 3. This allows the increased fluid pressure to slide the valve sleeve 3 and activation sleeve 6 toward the lower sub 8 in the housing 3 and begin to unblock the radial openings in the housing 2. Once valve sleeve 3 is fully open lock ring 4 lines up with the corresponding recess in the interior of the housing 2 and expands into the recess, thereby holding valve sleeve 3 in the open position.

As valve sleeve 3 is shifted, activation sleeve 6 pushes the seal ring 1 out of the radial recess in lower sub 8 and along the inclined wedge portion of the lower sub 8. This results in the seal ring being compressed such that the two ends of the "C" seal ring 1 contact each other and the inner diameter of the seal ring 1 is reduced. The two end surfaces of the seal ring 1 may be treated or otherwise have a coating in order to improve sealing between the two surfaces, particularly at lower well pressures. The compression of seal ring 1 also reduces the inner diameter of the seal ring 1 so that it protrudes inward of activation sleeve 6. Once activation sleeve 6 has sufficiently crushed or compressed the seal ring 1 into the wedged portion of lower sub 8, additional fluid pressure will shear the lower shear screw 11 and allow activation sleeve 6 to collapse inside of the valve sleeve 3. This also allows ball sleeve 18 to shift down as valve sleeve 3 shifts further down so that the mating surface toward the lower end of the ball sleeve 18 will contact the 45° angled surface of seal ring 1.

Additional pressure by ball sleeve 18 against the seal ring 1 further shifts it along the wedge surface of lower sub 8 as well as creates a seal between ball sleeve 18 and lower sub 8. Seal ring 1 also provides additional support for ball sleeve 18 so that the higher pressures can be used in the well, such as may occur during the fracturing operation, without relying solely on the key profile 9 to hold ball sleeve 18 in place against the pressure. In fact high pressures in the well can exceed the yield strength of the seal ring 1, in some cases by quite a significant amount. This can cause the seal ring 1 to slightly deform, thereby enhancing its sealing effect. In this way the seal ring 1 is a self-activating seal in that the more pressure that is applied the more tightly it seals.

In addition, sand and grit is often present in a well and has been known to cause leaks and failures in various convention valve seal designs. In contrast, the presence of sand and grit helps to enhance the seal provided by seal ring 1. Rather than damaging or deforming the seal material, as can happen when using rubber or other thermoplastic seals, sand and grit will pile up on top of the seal ring 1. This will serve to help plug up and seal any tiny openings that might be present due to imperfections formed in the seal ring 1 or mating surfaces.

Once fracturing operations are complete for that particular zone, there will no longer be an increased internal pressure inside the well above the ball. This allows the ball to lift off its seat in the ball sleeve 18 and immediately allow the flow of fluid from below the particular valve assembly. This allows fluid to be immediately produced from the well to clear sand or remaining proppant from the well after the fracturing process is completed. If the fluid pressure is sufficient, the ball may be pushed all the way up to the top of the well with the fluid being produced.

If the ball and ball sleeve are composed of a dissolvable material as discussed above, they will dissolve and break apart over the course of about a week following the fracturing operation without requiring any further actions. Once the ball sleeve 18 and ball are dissolved there would be no constrictions blocking any portion of the internal bore through the casing that extend inward of the valve sleeve 3 other than a portion of the ring seal 1. Preferably the ring seal 1 only protrudes about ¹⁄₁₆ of an inch inward of the valve sleeve 3. This is generally sufficient to not cause any noticeable decrease in the fluid flow through the casing or to prevent the use of any desired tool or other subassembly that might need to be lowered through the valve assembly. However, if the ball sleeve 18 is not composed of a dissolvable material or if for some reason the full internal diameter of the casing is required following the fracturing operation, the ball sleeve 18 and/or the seal ring 1 can be milled out in the conventional manner. In this case, the seal ring also helps to prevent or limit rotation of the ball sleeve 18, thereby helping to allow the ball sleeve 18 to be milled out if necessary or desired.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A seal for use in providing a fluid seal between a first downhole assembly having an inner surface and an inwardly inclined wedged section in the inner surface with a wide and narrow end and a second assembly having an outer surface and a radial edge where the diameter of the outer surface of the second assembly is less than the diameter of the inner surface of the first assembly, the seal comprising:
   a seal ring composed of metal and having a "C" shape with first and second opposing ends and an angled outer surface that matches the inclined wedge section;
      wherein in an initial configuration, the metal seal ring is located adjacent the wide end of the inclined wedge section, the first and second ends spaced apart from each other and the ring has an inner diameter that is not smaller than the diameter of the inner surface of the first assembly at the narrow end of the inclined wedged section and is not smaller than the diameter of the outer surface of the second assembly; and
   wherein in a second configuration where the seal ring is pushed into the inclined wedged section by an axial force the first and second ends of the ring sealingly contact each other and the ring has the inner diameter that is smaller than the outer diameter of the second assembly.

2. The seal of claim 1 wherein the angle of the angled outer surface is about 10°.

3. The seal of claim 1 wherein in the second configuration the inner diameter of the ring is about ¹⁄₁₆" smaller than the diameter of the inner surface of the first assembly.

4. The seal of claim 1 wherein the first and second opposing ends of the ring are treated to improve sealing when they contact.

5. The seal of claim 1 wherein an activation sleeve in the first assembly is used to shift the ring from the initial configuration to the second configuration.

6. The seal of claim 5 wherein the seal has a first upper angled surface adapted to match a surface at a lower end of the activation sleeve.

7. The seal of claim 6 wherein the first upper angled surface is about 60°.

8. The seal of claim 5 wherein the first downhole assembly has a radial slot in the inner surface that is adjacent to the wider end of the inclined wedged section and the ring is located in the radial slot when in the initial configuration.

9. The seal of claim 8 wherein the seal has a lower angled surface adapted to assist moving the ring out of the radial slot when shifting from the initial to the second configuration.

10. The seal of claim 9 wherein the lower angled surface is about 75°.

11. The seal of claim 1 wherein the metal is ASTM A48 Class 40 cast iron.

12. The seal of claim 1 wherein the metal has an ultimate tensile strength of from about 30,000 to about 40,000 psi and a hardness of from about 200 to about 250 HB.

13. The seal of claim 1 wherein the seal has a second upper angled surface adapted to match the radial edge of the second assembly.

14. The seal of claim 13 wherein the second upper angled surface is about 45° from the inner diameter of the seal ring.

15. The seal of claim 1 wherein:
the angle of the angled outer surface is about 10°
the seal has a first upper angled surface of about 60° that is adapted to match a surface at a lower end of an activation sleeve in the first assembly;
the seal has a second upper angled surface of about 45° from the inner diameter of the seal ring adapted to match the radial edge of the second assembly; and
the seal has a lower angled surface of about 75° adapted to assist moving the ring out of a radial slot in the first assembly when shifting from the initial to the second configuration.

16. A metal seal ring for use in downhole subassemblies comprising:
a tubular housing configured for use in a wellbore and having a central bore and an inner surface;
a radial recess in the inner surface of the tubular housing and wherein the inner surface adjacent to the radial recess is inwardly inclined to form a wedged interior surface;
an activation ring located inside the tubular housing and having a front surface;
a plug adapted to be located within the housing so as to provide a fluid seal for the central bore and having an angled sealing surface on the outside of the plug;
a seal ring composed of metal located within the radial recess, wherein the seal ring has a "C" shape and an inner diameter that does not initially protrude into the central bore;
wherein the seal ring has an outer diameter that is angled to mate with the wedged interior surface;
wherein the seal ring has a first angled surface that is angled to mate with the front surface of activation ring and a second angled surface adapted to contact a side of the radial recess in the tubular housing and a third angled surface adapted to contact the angled sealing surface on the plug;
wherein movement of the activation ring toward the seal ring pushes the seal ring out of the radial recess and against the wedged interior surface so as to reduce the inner diameter of the seal ring; and
wherein when the inner diameter of the seal ring is reduced, the angled sealing surface of the plug can contact the third angled surface of the seal ring so as to provide a seal between the plug and the housing.

17. The seal of claim 16 wherein the angled outer diameter of the seal ring is about 10°.

18. The seal of claim 16 wherein the first angled surface is about 60°.

19. The seal of claim 16 wherein the second angled surface is about 75°.

20. The seal of claim 16 wherein the third angled surface is about 45° from the inner diameter of the seal ring.

21. The seal of claim 16 wherein the metal is ASTM A48 Class 40 cast iron.

22. The seal of claim 16 wherein the metal has an ultimate tensile strength of from about 30,000 to about 40,000 psi and a hardness of from about 200 to about 250 HB.

23. The seal of claim 16 wherein:
the angled outer diameter of the seal ring is about 10°;
the first angled surface is about 60°;
the second angled surface is about 75°; and
the third angled surface is about 45° from the inner diameter of the seal ring.

* * * * *